United States Patent
Miller

(10) Patent No.: US 9,540,092 B2
(45) Date of Patent: Jan. 10, 2017

(54) MOVING CONFORMAL WINDOW FOR LARGE APERTURE OPTICS ON AIRCRAFT MOUNTED PODS

(71) Applicant: Raytheon Company, Waltham, MA (US)

(72) Inventor: Kirk A. Miller, Dallas, TX (US)

(73) Assignee: Raytheon Company, Waltham, MA (US)

( * ) Notice: Subject to any disclaimer, the term of this patent is extended or adjusted under 35 U.S.C. 154(b) by 101 days.

(21) Appl. No.: 14/482,319

(22) Filed: Sep. 10, 2014

(65) Prior Publication Data
US 2016/0068248 A1    Mar. 10, 2016

(51) Int. Cl.
*G01D 11/26* (2006.01)
*B64C 1/14* (2006.01)
*G03B 15/00* (2006.01)

(52) U.S. Cl.
CPC ............ *B64C 1/14* (2013.01); *G01D 11/26* (2013.01); *G03B 15/006* (2013.01)

(58) Field of Classification Search
CPC .......... G02B 26/00; B64C 1/14; G03B 15/007
See application file for complete search history.

(56) References Cited

U.S. PATENT DOCUMENTS

| | | |
|---|---|---|
| 3,930,339 A | 1/1976 | Jander |
| 4,130,029 A | 12/1978 | Klüting et al. |
| 4,656,780 A | 4/1987 | Miyauchi et al. |
| 4,744,172 A | 5/1988 | Miyauchi |
| 4,878,391 A | 11/1989 | Komatsu et al. |
| 4,887,779 A * | 12/1989 | Large ............ B64D 47/08 244/1 R |
| 4,969,293 A | 11/1990 | Guillon |
| 5,007,202 A | 4/1991 | Guillon |
| 6,305,736 B1 | 10/2001 | Enomoto et al. |
| 6,366,040 B1 | 4/2002 | Mclennan et al. |
| 6,533,218 B1 | 3/2003 | Jahn |
| 7,523,585 B2 | 4/2009 | Butera et al. |
| 7,765,738 B2 | 8/2010 | Dufour et al. |
| 7,891,718 B2 | 2/2011 | Heinaman |
| 8,186,103 B2 | 5/2012 | Grimm et al. |
| 8,388,043 B2 | 3/2013 | Lahnala |

FOREIGN PATENT DOCUMENTS

GB    2410232 A    7/2005

OTHER PUBLICATIONS

Partial International Search Report for corresponding International Application No. PCT/US2015/033083 dated Sep. 4, 2015.

* cited by examiner

*Primary Examiner* — Tony Ko
(74) *Attorney, Agent, or Firm* — Renner, Otto, Boisselle & Sklar, LLP

(57) ABSTRACT

A single monotlithic moving window may follow the free aperture of an optical sensor contained in a housing over a reasonable field of regard by translating the window with respect to the sensor and/or a pod cover. Because the window angle of attack is unvarying, near field turbulence is minimized over the envelope of operation.

17 Claims, 7 Drawing Sheets

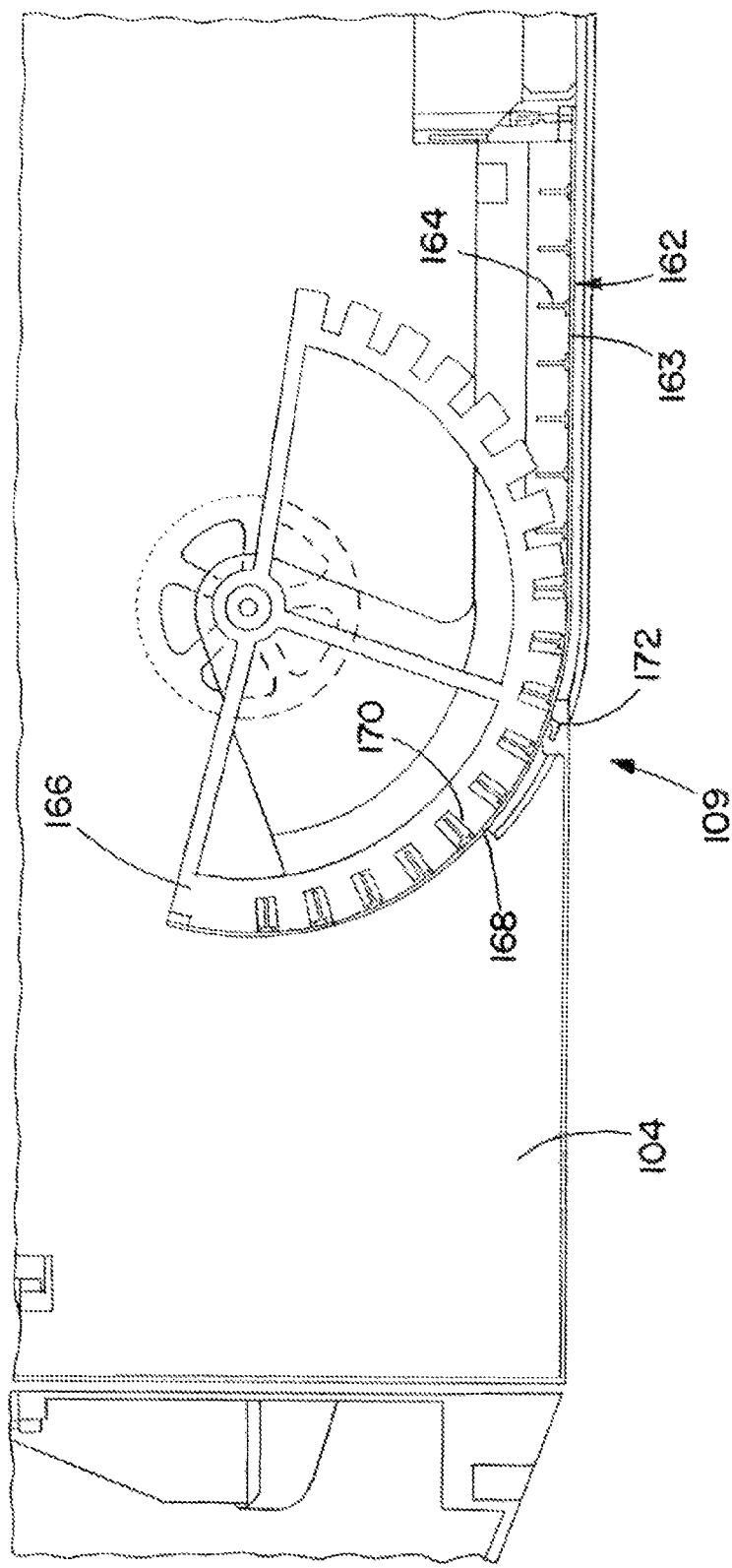

MOVING CONFORMAL WINDOW FOR LARGE APERTURE OPTICS ON AIRCRAFT MOUNTED PODS

GOVERNMENT LICENSE RIGHTS

The invention was made with Government support. The government has certain rights in the invention.

FIELD OF INVENTION

The present invention relates generally to windows for large aperture optics, and more particularly to a moving conformal window for such optics for use on aircraft mounted pods.

BACKGROUND

The windows used in aerospace applications are one of the most demanding applications for the single crystal or polycrystalline ceramics. They must strongly withstand severe aero-thermal heating, thermal shock resistance, rain drop and sand erosion, etc. Among the most suitable materials characterized by high strength and reasonable thermal conductivity in combination with high optical transmission over a broad wavelength ranges are ZnS, ZnSe, sapphire, and spinel.

Multi-pane conformal aircraft optical windows reduce resolution at all fields of regard where a sensor free aperture spans two or more panes. Resolution is reduced due to optical path differences induced by window thickness differences, window incidence angle, window wedge angle, and index of refraction variation between the spanned panes. Window pane size is limited by the current state of the art for manufacture of multi-spectral window optical grade blanks.

SUMMARY OF INVENTION

On turret and pod sensors these constraints may be mitigated by fixedly mounting a single pane window to a cover. The cover rotates with the sensor line of sight; however, near field air flow turbulence caused by the large changes in angle of attack can limit resolution as well. On other systems the window panes are made as large as possible. In these systems, two problems result. First, losses in resolution due to vignetting or spanned panes may occur. Second, field of regard may be limited. In the second case, the flight path of the aircraft may be used to point the sensor. On high altitude systems no optical window is used and the optics are open to the atmosphere.

In order to overcome the problems associated with these conventional approaches, a single monotlithic moving window may follow the free aperture of the optical sensor over a reasonable field of regard by translating the window with respect to the sensor and/or a pod cover. Because the window angle of attack is unvarying, near field turbulence is minimized over the envelope of operation.

Therefore, according to one aspect of the invention, a positionable optical window includes a pane of optically transmissive material; a pod structure in which the pane is mounted and with respect to which the pane is translatably moveable; an optical sensor mounted inside the pod structure and having an optical field of view that passes through the pane, wherein the optical sensor is rotatable with respect to the pod structure; and a positioning mechanism for translating the pane with respect to the pod structure in a longitudinal direction, wherein the positioning mechanism is configured to translate the pane synchronously with rotation of the optical sensor keeping the pane aligned with the field of view of the optical sensor.

Optionally, the positioning mechanism includes a stress relieving mechanism.

Optionally, the pane is moveable relative to the positioning mechanism.

Optionally, the positioning mechanism includes a statically-indeterminate linkage mechanism.

Optionally, the statically-indeterminate linkage mechanism includes a whiffletree structure.

Optionally, the pane is disposed in a frame having a pair of longitudinally extending tracks on opposite sides of the frame, and the positioning mechanism includes a plurality of rollers positioned above and below each of the tracks and configured to support the frame at the tracks.

Optionally, at least a portion of the plurality of rollers are mounted in the stress relieving mechanism with a preload pressing the portion of the plurality of rollers against the tracks.

Optionally, the window includes a frame in which the pane is sealingly secured, the pane being fixed with respect to the frame.

Optionally, the window includes a longitudinally articulable or longitudinally flexible gap element sealingly bonded to the pane and/or frame and extending in the longitudinal direction from longitudinal ends of the pane and/or frame, the articulable or flexible element is longitudinally movable with the frame.

According to another aspect of the invention, a positionable optical window includes a pane of optically transmissive material; a pod structure in which the pane is translatably moveable along a moving axis; and a positioning mechanism for translating the pane with respect to the pod structure, wherein the positioning mechanism includes a stress relieving mechanism.

Optionally, the pane is moveable relative to the positioning mechanism.

Optionally, the positioning mechanism includes a statically-indeterminate linkage mechanism.

Optionally, the statically-indeterminate linkage mechanism includes a whiffletree structure.

Optionally, the pane is disposed in a frame having a pair of longitudinally extending tracks on opposite sides of the frame, and the positioning mechanism includes a plurality of rollers positioned above and below each of the tracks and configured to support the frame at the tracks.

Optionally, at least a portion of the plurality of rollers are mounted in the stress relieving mechanism with a preload pressing the portion of the plurality of rollers against the tracks.

Optionally, the window includes a frame in which the pane is sealingly secured, the pane being fixed with respect to the frame.

Optionally, the window includes a longitudinally articulable or longitudinally flexible gap element sealingly bonded to the pane and/or frame and extending in the longitudinal direction from longitudinal ends of the pane and/or frame, the articulable or flexible element is longitudinally movable with the frame.

Optionally, the positioning mechanism is configured to translate the pane synchronously with rotation of the optical sensor keeping the pane aligned with the field of view of the optical sensor.

According to another aspect of the invention, a positionable optical window includes a pane of optically transmissive material; a frame in which the pane is sealingly secured, the window being fixed with respect to the frame; a pod structure having an opening in which the pane and frame are translatably moveable along a moving axis, wherein the opening is longer along the moving axis than the pane and the frame; a longitudinally articulable or longitudinally flexible gap element sealingly bonded to the pane and/or frame and extending in the longitudinal direction from longitudinal ends of the pane and/or frame, the articulable or flexible element is longitudinally movable with the frame; and a positioning mechanism for translating the frame with respect to the pod structure.

Optionally, the window includes a counterweight mounted within the pod structure and moveable relative the pod structure. The counterweight is configured to move opposite the pane, maintaining center of mass of the window.

The foregoing and other features of the invention are hereinafter described in greater detail with reference to the accompanying drawings.

BRIEF DESCRIPTION OF THE DRAWINGS

FIG. 6 shows a detailed sectional view of an exemplary driving mechanism in the sensor pod of FIG. 1A.

DETAILED DESCRIPTION

Optical sensors may be deployed on a range of platforms including fixed wing and rotary aircraft (autonomous, remote-controlled and piloted). In order to provide a wide field of view for an optical sensor while protecting the sensor from the elements, conventional craft have housed sensors in movable/rotatable pods having the sensor fixed with respect to the movable pod, and in fixed pods having large multi-paned windows with sensors free to move within the pod structure. The movable pod typically has poor aerodynamic performance because of a spherical shape and a varying angle of attack dependent on pointing angle. Multi-pane windows, on the other hand, typically have poor optical performance because of seams between the panes, and different angles of the panes with respect to the sensor.

In order to overcome the problems associated with these conventional approaches, a single monotlithic moving window with a single pane may be provided. The pane may follow the free aperture of the optical sensor over a reasonable field of regard by translating the window with respect to the sensor and/or a pod cover. Because the window angle of attack is unvarying, near field exterior air flow turbulence is minimized over the envelope of operation.

The optical window may be potted to a (preferably metal) frame that rolls on a kinematic rolling mechanism to prevent excessive stress and objectionable strain in the optical window. Exemplary moving window mechanisms minimize geometry variation of aerodynamic surfaces upstream of the optical window to assure minimal near field turbulence induced by air density variation. Provisions for environmentally sealing the optical instrument volume from atmosphere borne dust and moisture are provided. Integral features are included for protection of the window (which may cost millions of dollars) during shipping and installation. Exemplary mechanisms may include integral vibration and shock overloading features. Take-up drums may provide tension and drive a membrane attached to the window over the sensor field of regard in a coordinated way with respect to the inner gimbal axes.

Figure 1A:
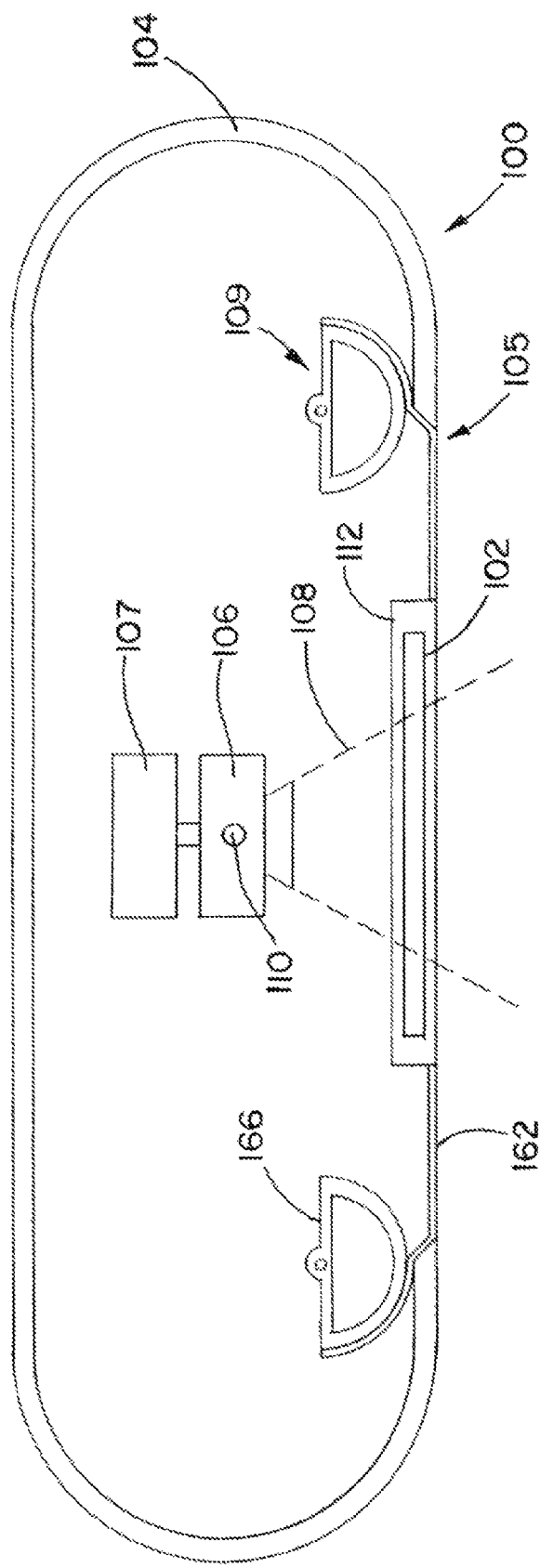
FIG. 1A shows a side schematic view of an exemplary sensor pod having a translatable window pane in a first position.
Figure 1B:
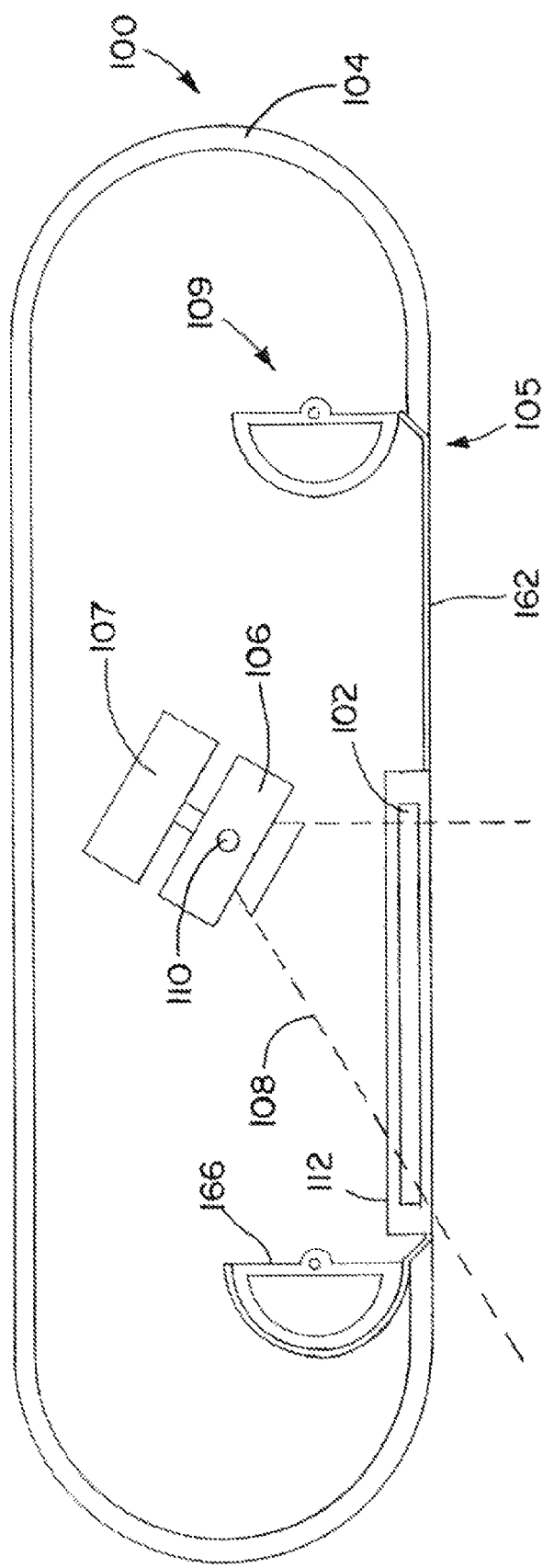
FIG. 1B shows a side schematic view of the sensor pod of FIG. 1A, with the translatable window pane in a second position.
Figure 2:
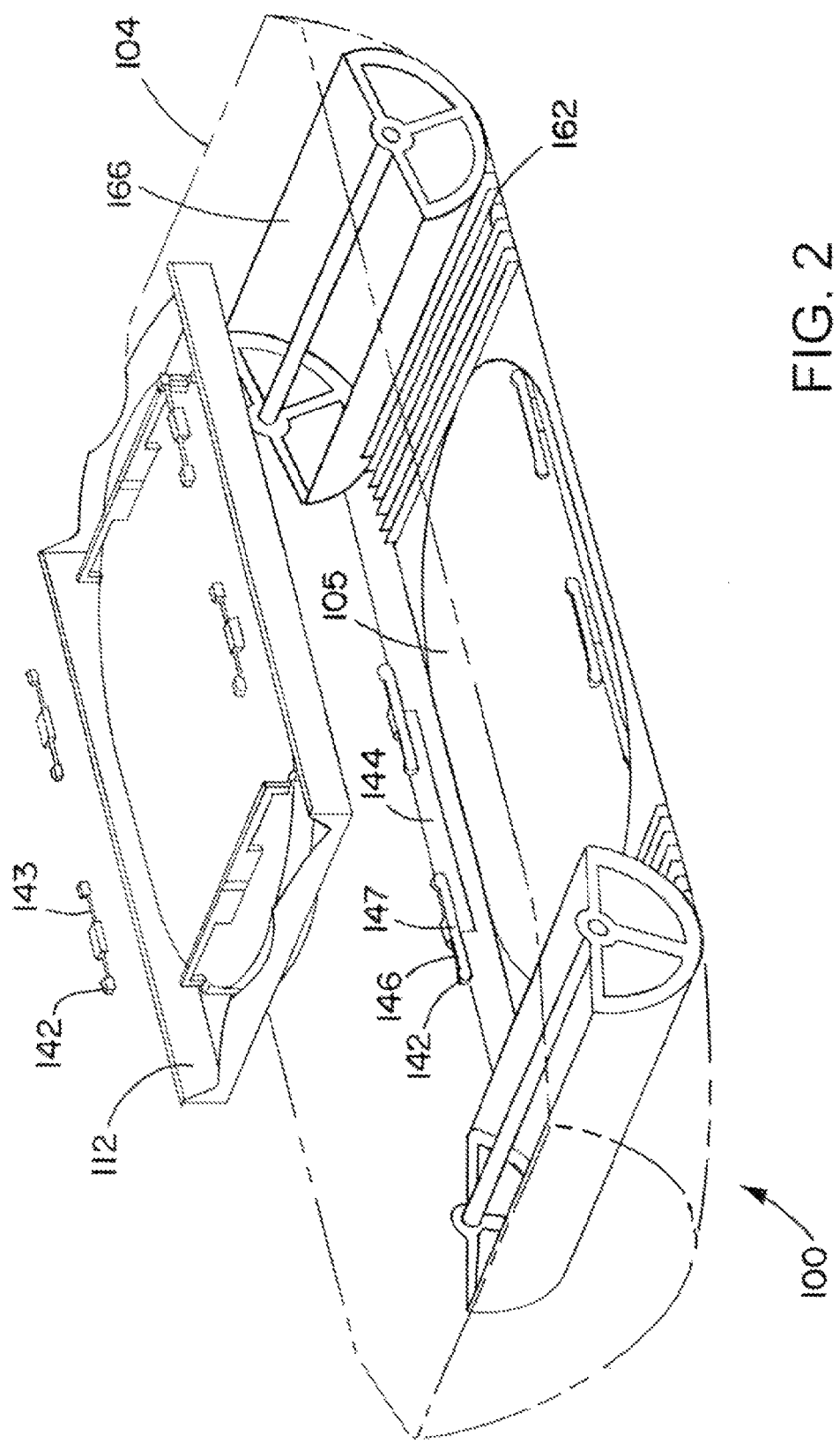
FIG. 2 shows an exploded partial oblique view of the sensor pod of FIG. 1A having a translatable window pane.

FIGS. 1A and 1B show a schematic side view of a sensor pod 100. Although shown as a sensor pod 100, it is understood that the sensor system described herein may be a stand-alone sensor pod unit that may be mounted to a vehicle (for example, a fixed or rotary wing aircraft), or may be integrated directly into the body of an aircraft. The sensor pod has a positionable optical window shown in a first "intermediate" position in FIG. 1A, and a second "forward-looking" position in FIG. 1B. FIG. 2 shows the bottom half of an exemplary sensor pod 100 in a exploded partial oblique view.

The window 100 includes a pane 102 of optically transmissive material such as glass. Preferable materials for the pane include ZnS, ZnSe, sapphire, and spinel. The pane 102 is translatable with respect to a surrounding pod structure 104 in pod opening 105 by means of a driving mechanism 107. The pane 102 provides an optical path for one or more optical sensors 106. The pane may be large enough to provide for an uninterrupted field of view through the entire range of motion of the optical sensor 106. For example, the pane 102 may be approximately 60 cm wide by 90 cm long (2 feet wide by 3 feet long) and oriented so that the longer dimension is aligned with the dominant travel path of the vehicle so as to maximize aerodynamic performance. Because such a large pane 102 is heavy, a counterweight 109 is provided in the illustrated embodiment, which acts to maintain the center of mass of the pod 100 by moving opposite the pane 102.

The counterweight 109 may be fixedly coupled to the optical sensor, or may be separately translated or rotated so as to counterbalance the movement of the pane to maintain the center of mass of the sensor pod. The motion of the counterweight 109 may be synchronized with the movement of the pane 102 via software or via mechanical coupling (by, for example, gearing).

The optical sensor 106 may include any known optical sensor such as, for example, a full motion video sensor that may be transmitted from the vehicle and may be recorded on the vehicle or at a remote location. Sensors may also operate in the visible and/or non-visible spectrum and include a multitude of visible, near infrared, shortwave infrared, mid-wave infrared, and longwave infrared cameras. Alternatively or additionally, the sensor pod may include an optical emitter such as a laser that is oriented to emit through the pane 102.

The optical sensor 106 may be mounted inside the pod structure 104 and have an optical field of view 108 that passes through the pane 102. The optical sensor 106 is rotatable with respect to the pod structure 104 and with respect to the pane 102. The axis of rotation 110 may pass through the center of mass of the sensor, but may also be located elsewhere. Alternatively or additionally, the sensor 106 may also be translatable with respect to the pod structure 104. For example, if the sensor 106 rotates clockwise from the position shown in FIG. 1A to the position shown in FIG.

1B, the sensor 106 may also move to the right (not shown) in order minimize the movement required from the pane 102.

Figure 3:
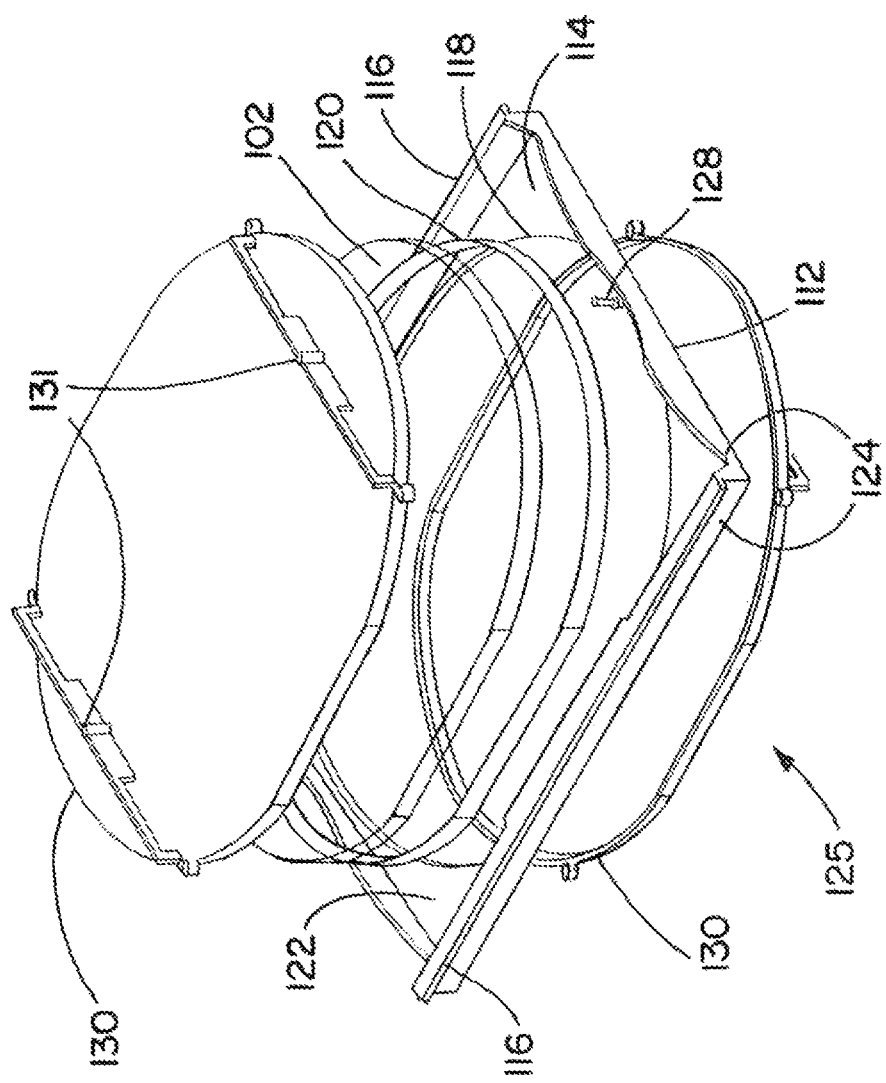
FIG. 3 shows an exploded view of an exemplary window frame assembly for use in the sensor pod of FIG. 1A.

The pane 102 is disposed in a frame 112 that provides structural support for the pane 102. The frame 112 may preferably be made of metal, for example aluminum or titanium. Turning to FIG. 3, the frame 112 includes a body 114 having a pair of longitudinally extending tracks 116 on opposite sides of the frame 112. As will be discussed below, these tracks ride along rollers to allow the frame 112 and pane 102 to move along the longitudinal axis of the pod 100, which may correspond to the dominant movement path of the vehicle.

In exemplary embodiments, the frame body 114 includes a horizontally-extending pane portion 122 having a centrally located socket 118 for receiving the pane 102. To increase rigidity in the frame 112, vertically-extending stiffening portions 124 extend transversely (upward) from edges of the pane portion 122. The tracks 116 extend laterally outward from the top ends of opposite stiffening portions 124.

The pane 102 is oval in shape, for example, and fits in the complimentary socket 118 of the frame. Of course, other shapes of the pane are possible. The pane 102 is sealed to the frame 112 by a seal 120. As one example, the seal 120 may be RTV potting about 3.5 mm (0.138 inches) thick, disposed along the perimeter of the pane 102. The frame 112 may also include some interface 128 for securing the frame 112 to the driving mechanism 107 of the pod 100, for example to spring-loaded captive screws and an associated housing.

During transit of the pane 102 from a manufacturer, and before installation in the pod 100, the pane 102 may be disposed in the frame 112 and secured with top and bottom covers 130 which may include some form of lifting fixture 131 to assist in movement of the pane/frame assembly 125. The covers 130 may be attached, for example, with spring-loaded captive screws to prevent screw contact with the pane 102.

Figure 4:
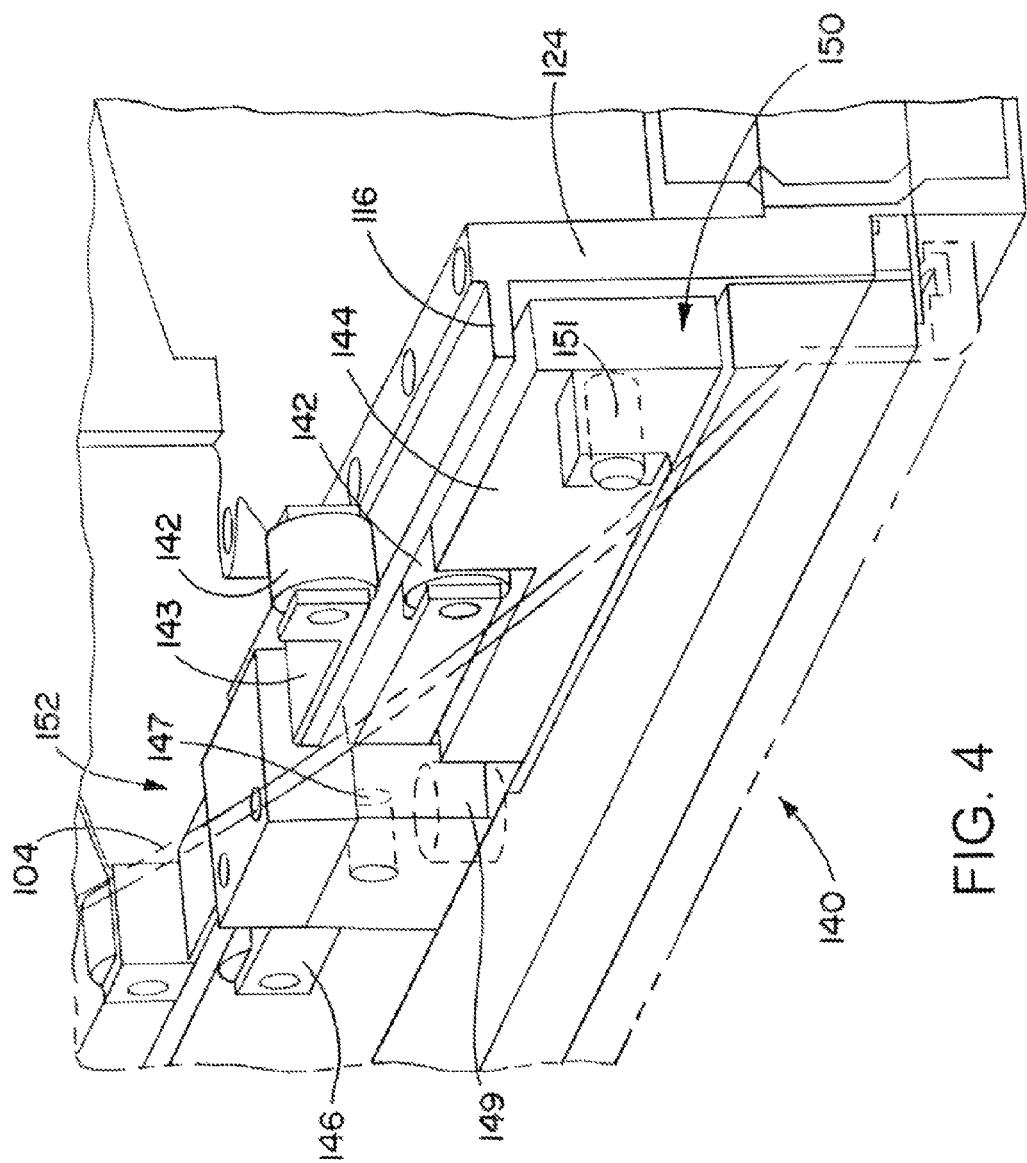
FIG. 4 shows a detailed sectional perspective view of an exemplary support assembly in the sensor pod of FIG. 1A.
Figure 5:
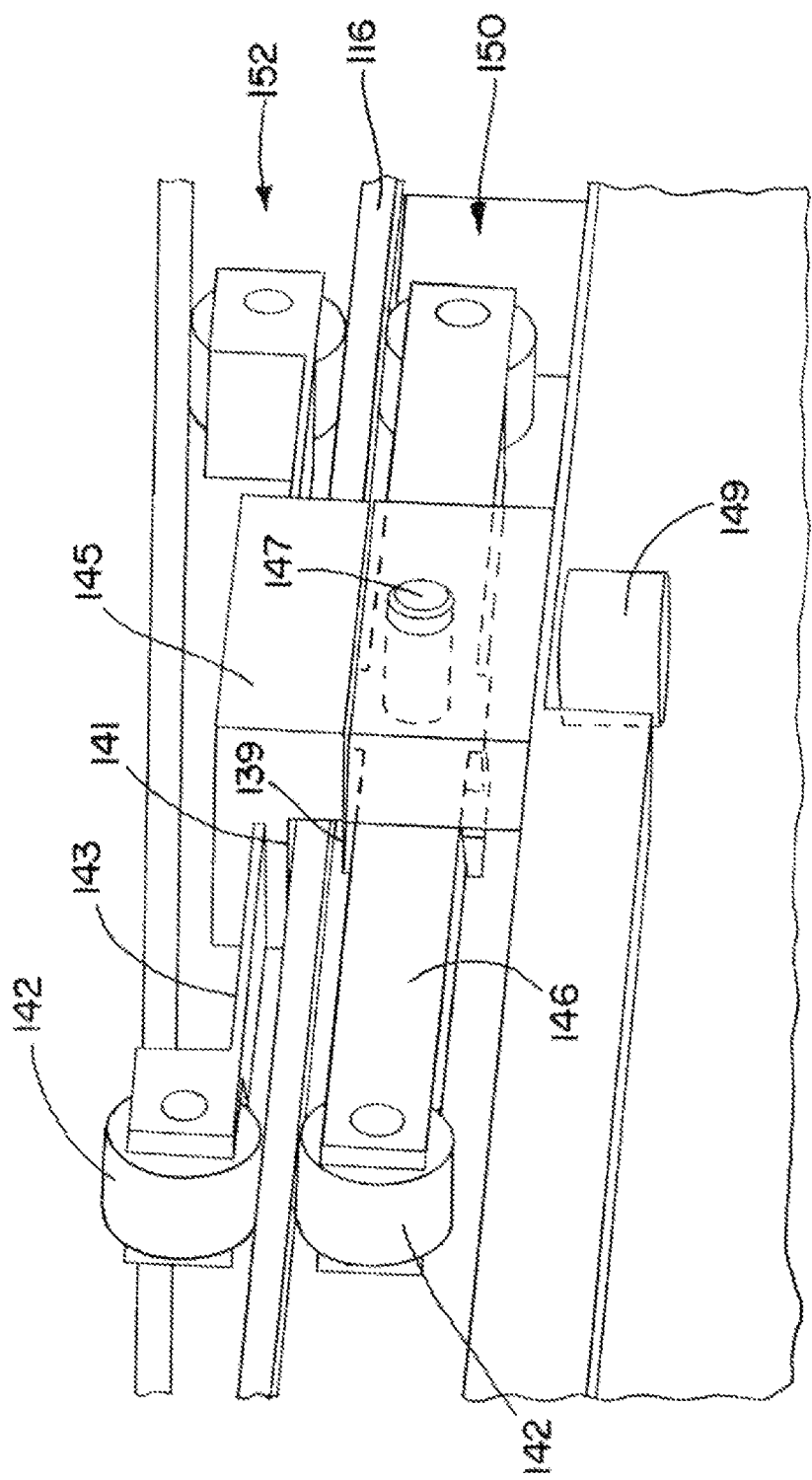
FIG. 5 shows a detailed perspective view of the exemplary support assembly in the sensor pod of FIG. 1A.

The pane 102 and the frame 112 may be translated with respect to the pod structure 104 via a driving mechanism 107 that provides the motive force to move the frame 112 in a support assembly 140 (FIG. 4) for slidably supporting the frame 112 in the pod structure 104. With reference to FIGS. 2, 4 and 5, the support assembly 140 supports the frame 112 in the pod structure 104, allows movement of the frame 112 in the longitudinal direction, and may constrain movement of the frame 112 in other directions. In the exemplary embodiment depicted, the support assembly 140 includes a plurality of rollers 142 that receive the tracks 116 and are positioned both above and below each of the tracks. The rollers 142 may be rigid (for example, made of metal) or resilient (for example, made of rubber or polymer).

The support assembly 140 includes a stress-relieving mechanism in order to accommodate parts that are not perfectly formed, and thereby minimize asymmetric window deflection. The stress-relieving mechanism may be, for example, a resilient or bendable feature such as rubber rollers or spring-loaded rigid rollers. Additionally or alternatively, the stress relieving mechanism may be a statically indeterminate linkage mechanism/suspension arrangement such as a double-tree whiffletree arrangement as illustrated in FIGS. 2 and 4 or a rocker-bogie suspension whiffletree. Preferably, the statically-indeterminate linkage mechanism carries only the lower rollers 142 in a lower roller assembly 150, while the upper rollers 142 are carried on preloaded spring supports 143 in an upper roller assembly 152.

FIG. 4 shows a detailed view of half of the symmetrical whiffletree arrangement shown in full in FIG. 2. A central bar 144 is pivotably mounted to the pod structure 104 at a pivot point 151 that is at or near the center of the length of the central bar 144. At both free ends of the central bar 144, a roller bar 146 is pivotably mounted at or near its center of length, at a pivot point 147. At each free end of the roller bar 146, a roller 142 is rotatably mounted. As shown in FIG. 5, the roller bar 146 includes a central raised portion 139 providing a contact surface to prevent permanent bending deformation of the pivot bar 147. Such a linkage arrangement distributes the forces acting on the rollers 142 evenly though the linkages to the pod structure 104.

Some or all of the rollers 142 may be preloaded or biased against the tracks 116, for example, by being mounted on the spring supports 143. In particular, the rollers 142 positioned above the track 116 in the upper roller assembly 152 may be biased against the track 116 via a leaf spring support 143 in order to maintain contact with the track 116 when gravity is not pressing the track 116 against those rollers 142. The leaf spring support 143 may extend from a roller body 145 having an overload contact surface 141 to prevent overloading of the leaf spring support 143. In addition, the preload may counteract gravity in situations where the pod 100 is upside-down, thus pressing the tracks 116 against the rollers 142 normally (when not upside-down) positioned under the tracks 116.

The support assembly 140 may also include rollers 149 that are oriented perpendicularly to the rollers 142 and ride against the lateral vertically-extending stiffening portions 124 of the frame 112 to constrain the frame 112 from moving in the lateral direction, and to prevent binding during longitudinal movement of the frame 112.

Turning now to FIGS. 2 and 6, the driving mechanism 107 is configured to translate the pane 102 (FIG. 1A) synchronously with rotation of the optical sensor 106 (FIG. 1A), keeping the pane 102 aligned with the field of view of the optical sensor 106. The synchronicity of movement may be accomplished via electronic control (either hardware or software incorporating an equation describing the relationship of the movements) or via mechanical control (by, e.g., gearing). For example, the window pane 102 may be slaved by software to movement of the optical sensor 106 via a look-up table or an equation that specifies window position relative to a pitch angle of the optical sensor 106.

The pane 102 and/or the frame 112 may be attached to the driving mechanism 107 by means of an articulable or flexible gap element 162 sealingly bonded to the pane 102 and/or the frame 112. For example, the gap element 162 may be interface bonded or fusion bonded to the frame 112. The gap element 162 extends away from the frame 112 and fills the gap between the frame 112 and the pod structure 104 (FIG. 1A) on both sides of the frame 112 in order to maintain a uniform outer surface of the pod structure 104 to increase aerodynamic efficiency and reduce aerodynamically induced optical aberrations in the sensor's field of view. The gap element 162 may be unitary, two-piece (one on either side of the frame, or multi-paneled (as in an articulable gap element composed of garage-door-type panels). A gap element body 163 of the gap element 162 may be made of a thin metal, cloth/fabric, or a mylar or thermoplastic sheet, for example.

The gap element 162 is flexible or articulable in the longitudinal direction in order to be bent upward out of the way of the pod structure 104 (FIG. 1A). This allows the pod structure 104 to be shorter than would be possible if the gap element 162 were longitudinally rigid. The gap element 162 is preferably rigid transverse to the longitudinal direction, so as to maintain its uniform outer surface. In the illustrated flexible gap element 162, this rigidity may be supplied by a plurality of stiffening members 164 attached to the body 163 of the gap element 162 (for example, by bonding or fusion bonding). The stiffening members 164 may protrude perpendicular to the inside surface of the gap element body 163, toward the inside of the pod structure 104 to enhance their rigidity, forming an I-beam or T-beam like shape.

The driving mechanism 107 may include drums 166 at either axial end of the opening of the pod structure 104. The drums 166 may be attached to respective gap elements 162 and pull the gap elements 162 and thus the frame 112 and the pane 102 in the longitudinal direction to position the pane 102 with respect to the pod structure 104. The gap elements 162 may be attached to the drum 166 directly or via straps (not shown). Preferably, each gap element 162 and/or strap is pretensioned so as to keep the gap element 162 tight and thus maintain longitudinal stability along the portion of the gap element 162 exposed to the area outside the pod structure 104.

The drums 166 may be activated directly by a motive source (e.g., an electric motor), or may be activated through a driven assembly of gears, pulleys, chains, linkages, or other power transmission devices. The drum 166 is shown as being a sector of a cylinder, although a full cylinder may also be used. Other shapes are possible, however a circular outer shape is preferred. An outer drum surface 168 of the drum 168 may include recesses 170 to accept the stiffening members 164.

The sensor pod 100 may be generally ellipsoidal or "missile-like" in shape. As stated earlier, the pod structure 104 has an opening 105 in which the pane and frame are translatably moveable along a moving (longitudinal) axis. The opening 105 is preferably longer along the longitudinal axis than along the transverse axis. Further, the opening 105 is preferably longer in the longitudinal axis than the pane 102 and the frame 112, so as to allow the frame 112 and pane 102 to move within the opening 105 without obscuring the view through the pane 102 along the pane's movement. The opening 105 may be fully or partially surrounded with a dynamic seal 172 that acts to seal the pod structure 104 to the gap element and/or frame.

The sensor pod 100 may be mounted to an aircraft (for example, under a wing of the aircraft) in a static or dynamic manner. For example, the pod 100 may be mounted on a mount allowing the pod 100 to be rotated about the longitudinal axis. This rotation of the pod 100 about the longitudinal axis would allow the optical sensor 106 to be rotated with the pod 100 so as to increase the effective field of view in the lateral direction, transverse to the longitudinal direction. Along with the longitudinal translation of the pane 102 discussed above, the optical sensor 106 may have a nearly unlimited effective field of view. In practice however, the field of view is typically limited to being rotated about 90-100 degrees in either direction laterally (giving a 180-200 degree arc of movement), and about 45 degrees forward and about 25 degrees aft (giving a 70 degree arc of movement. The pod 100 may also be rotated 180 degrees so as to "stow" the pod 100 in a protective position with the pane 102 and optical sensor 106 facing upward (toward the wing) when not in use (for example, during take-off, landing, and taxiing).

The optical sensor 106 may also be controlled to rotate independently of movement of the pane 102, thus providing a "bypass" if, for example, the window movement is impeded by a mechanical failure. For example, the bypass tilt may be about 19 degrees forward and about 25 degrees aft. The amount of tilt possible in this bypass mode may be constrained by the size and location of the pane 102.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical sensor system comprising:
   a pane of optically transmissive material;
   a structure in which the pane is mounted and with respect to which the pane is translatably moveable;
   an optical sensor having an optical field of view that passes through the pane, wherein the optical sensor is rotatable with respect to the structure, wherein the pane is translatably movable relative to the optical sensor; and
   a driving mechanism for translating the pane with respect to the structure, wherein the driving mechanism is configured to translate the pane synchronously with rotation of the optical sensor keeping the pane aligned with the field of view of the optical sensor.

2. The optical sensor system of claim 1,
   further comprising an articulable or flexible gap element coupled to the pane, and extending in opposite directions away from ends of the pane;
   wherein the articulable or flexible element is movable with the pane.

3. The optical sensor system of claim 1,
   wherein the driving mechanism includes a first drum positioned at a first end of the structure, and a second drum at an opposite end of the structure;
   wherein opposite ends of the gap element are coupled to the drums; and
   wherein the drums are rotated by a motive device to control a position of the gap element and the pane.

4. The optical sensor system of claim 1, further comprising a support assembly slidably supporting the pane in the structure, wherein the support assembly includes a stress relieving mechanism.

5. The optical sensor system of any one of claim 4, wherein the support assembly includes a statically-indeterminate linkage mechanism.

6. The optical sensor system of claim 5, wherein the statically-indeterminate linkage mechanism includes a whiffletree structure.

7. The optical sensor system of claim 4,
   wherein the pane is disposed in a frame having a pair of tracks on opposite sides of the frame; and
   wherein the support assembly includes a plurality of rollers positioned above and below each of the tracks and configured to support the frame at the tracks.

8. The optical sensor system of claim 7, wherein at least a portion of the plurality of rollers are mounted in the stress relieving mechanism with a preload pressing the portion of the plurality of rollers against the tracks.

9. The optical sensor system of claim 1, further comprising a frame in which the pane is sealingly secured, the pane being fixed with respect to the frame.

10. The optical sensor system of claim 1, wherein the pane is moveable relative to the support assembly.

11. The optical sensor system of claim 1,
further comprising a counterweight mounted within the structure and moveable relative the structure,
wherein the counterweight is configured to move opposite the pane, maintaining center of mass of the optical sensor system.

12. The optical sensor system of claim 1, wherein the pane is linearly translatable relative to the structure, to thereby keep the pane aligned with the field of view of the optical sensor as the optical sensor rotationally tilts relative to the structure.

13. The optical sensor system of claim 1, wherein the pane is made of a solid optically transmissive material and the solid optically transmissive material is aligned with the field of view of the optical sensor.

14. The optical sensor system of claim 13, wherein the solid optically transmissive material includes glass.

15. The optical sensor system of claim 14, wherein the glass includes ZnS, ZnSe, sapphire, or spinel.

16. The optical sensor system of claim 1, wherein the optical sensor is rotatable relative to the pane, to thereby keep the field of view of the optical sensor aligned with the pane as the pane translates relative to the structure.

17. The optical sensor system of claim 16, wherein the pane is linearly translatable relative to the optical sensor, to thereby keep the pane aligned with the field of view of the optical sensor as the optical sensor rotationally tilts relative to the structure.

* * * * *